United States Patent
Klaus et al.

(10) Patent No.: US 12,234,747 B2
(45) Date of Patent: Feb. 25, 2025

(54) PART OF A GAS TURBINE ENGINE AND METHOD FOR THE MANUFACTURING THE PART

(71) Applicant: Rolls-Royce Deutschland Ltd & Co KG, Blankenfelde-Mahlow (DE)

(72) Inventors: Christoph Klaus, Teltow (DE); Reyya Nitin Rao, Berlin (DE); Sebastian Spitzer, Dresden (DE); Maik Gude, Dresden (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 18/066,536

(22) Filed: Dec. 15, 2022

(65) Prior Publication Data
US 2023/0193770 A1    Jun. 22, 2023

(30) Foreign Application Priority Data

Dec. 17, 2021    (DE) ............. 10 2021 214 605.8

(51) Int. Cl.
| F01D 9/04 | (2006.01) |
| B29C 70/38 | (2006.01) |
| F01D 5/28 | (2006.01) |

(52) U.S. Cl.
CPC ............ F01D 9/041 (2013.01); *B29C 70/38* (2013.01); *B32B 2262/16* (2021.05);
(Continued)

(58) Field of Classification Search
CPC ...... F01D 5/282; B29C 70/38; B32B 2262/16
See application file for complete search history.

(56) References Cited

U.S. PATENT DOCUMENTS

| 5,026,595 A | * | 6/1991 | Crawford, Jr. | .......... B29C 70/24 |
| | | | | 428/221 |
| 6,103,337 A | * | 8/2000 | Burgess | .................. B29B 11/16 |
| | | | | 156/92 |

(Continued)

FOREIGN PATENT DOCUMENTS

DE    102014207017 A1 * 10/2015 ............. B29B 11/16

OTHER PUBLICATIONS

Mingwei Chen, et al., "Research Progress of Continuous Fiber Reinforced Ceramic Matrix Composite in Hot Section Components of Aero engine" 2019 IOP Conf. Ser.: Mater. Sci. Eng. 678 012043 (Year: 2019).*

(Continued)

*Primary Examiner* — Christopher Verdier
*Assistant Examiner* — Arthur Paul Golik
(74) *Attorney, Agent, or Firm* — SHUTTLEWORTH & INGERSOLL, PLC; Timothy J. Klima

(57) ABSTRACT

The invention relates to a component of a gas turbine engine which has a fiber-composite material having a multiplicity of rovings, wherein at least one roving of the fiber-composite material along the spatial extent thereof has a variable cross section, at least two rovings have in each case a dissimilar cross section and/or the at least one roving follows a variable direction and the at least one roving is deposited by means of tailored fiber placement. The invention also relates to a method of a component.

16 Claims, 10 Drawing Sheets

(52) U.S. Cl.
CPC .......... *F01D 5/282* (2013.01); *F05D 2220/36* (2013.01); *F05D 2230/30* (2013.01); *F05D 2300/603* (2013.01)

(56) References Cited

U.S. PATENT DOCUMENTS

| | | | |
|---|---|---|---|
| 2011/0150643 A1* | 6/2011 | Wery | F01D 25/162 |
| | | | 415/200 |
| 2013/0004715 A1* | 1/2013 | Jarmon | B29D 99/0005 |
| | | | 428/156 |
| 2017/0254212 A1* | 9/2017 | Pautard | F01D 9/02 |
| 2018/0100516 A1* | 4/2018 | Onfray | F01D 9/042 |
| 2020/0063307 A1* | 2/2020 | Rudolph | D05B 69/18 |
| 2021/0254493 A1 | 8/2021 | Jones et al. | |

OTHER PUBLICATIONS

German Search Report dated Aug. 31, 2022 from counterpart German Patent Application No. 102021214605.8.

Website Video: ZSK Technical Embroidery Systesm, Tailored Fiber Placement: Introduction & Advantages; Sep. 2, 2019; https://duckduckgo.com/?q=tailored+fiber+placement&t=newext&atb=v342-1&iax=videos&ia=videos&iai=https%3A%2F%2Fwww.youtube.com%2Fwatch%3Fv%3DUUTPQegB2t8.

Website Video: Institut für Flugzeugbau Universität Stuttgart; The Tailored Fiber Placement Process; Jul. 27, 2017; https://duckduckgo.com/?q=tailored+fiber+placement&t=newext&atb=v342-1&iax=videos&ia=videos&iai=https%3A%2F%2Fwww.youtube.com%2Fwatch%3Fv%3DS2mO718uofo.

Website Video: Dmaass99; Automated Fiber Placement Introduction; Feb. 24, 2018; https://duckduckgo.com/?q=tailored+fiber+placement&t=newext&atb=v342-1&iax=videos&ia=videos&iai=https%3A%2F%2Fwww.youtube.com%2Fwatch%3Fv%3DH9T-YC1gbm8.

\* cited by examiner

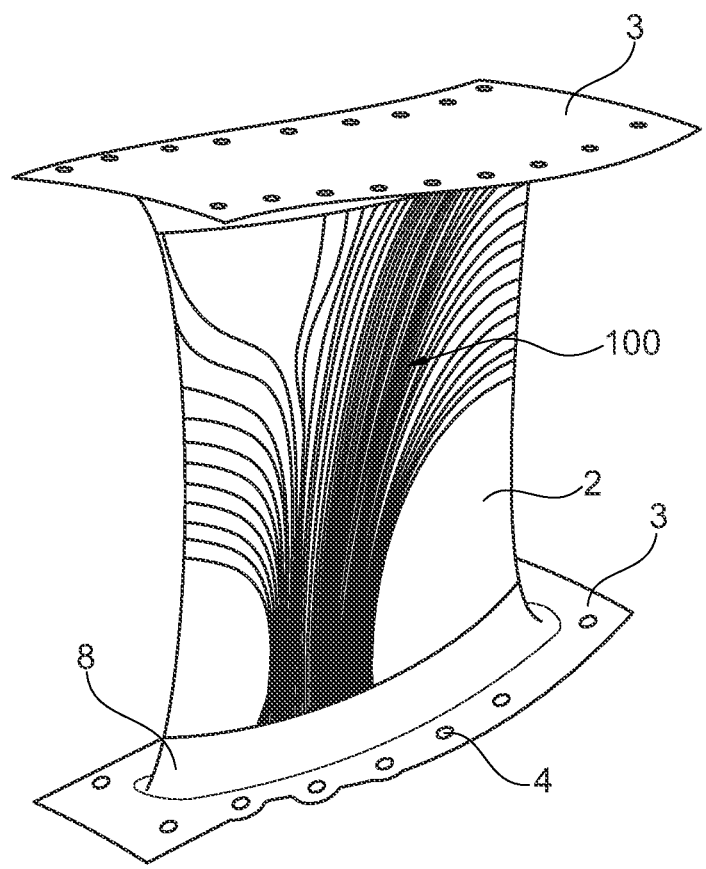
Fig. 6
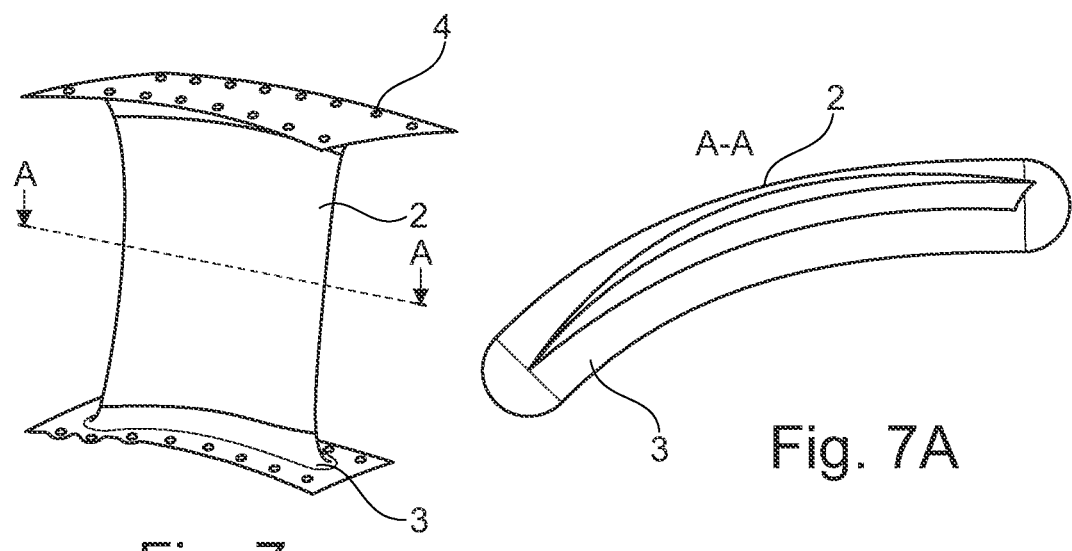
Fig. 7
Fig. 7A

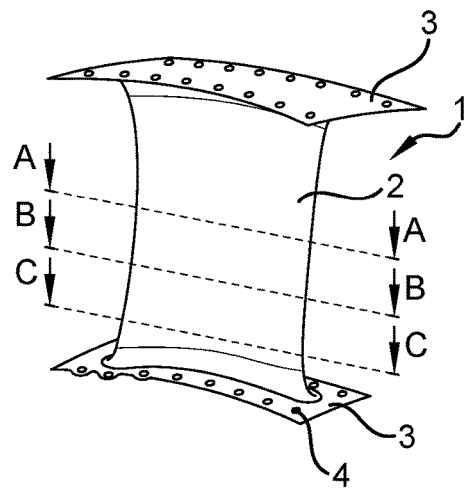
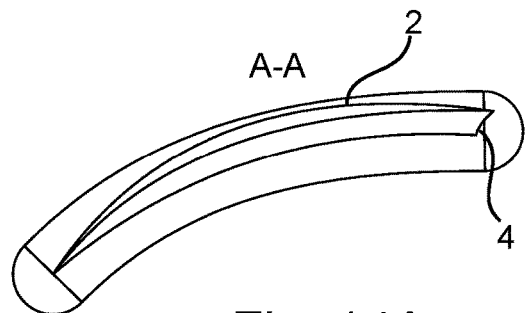
Fig. 14A
Fig. 14
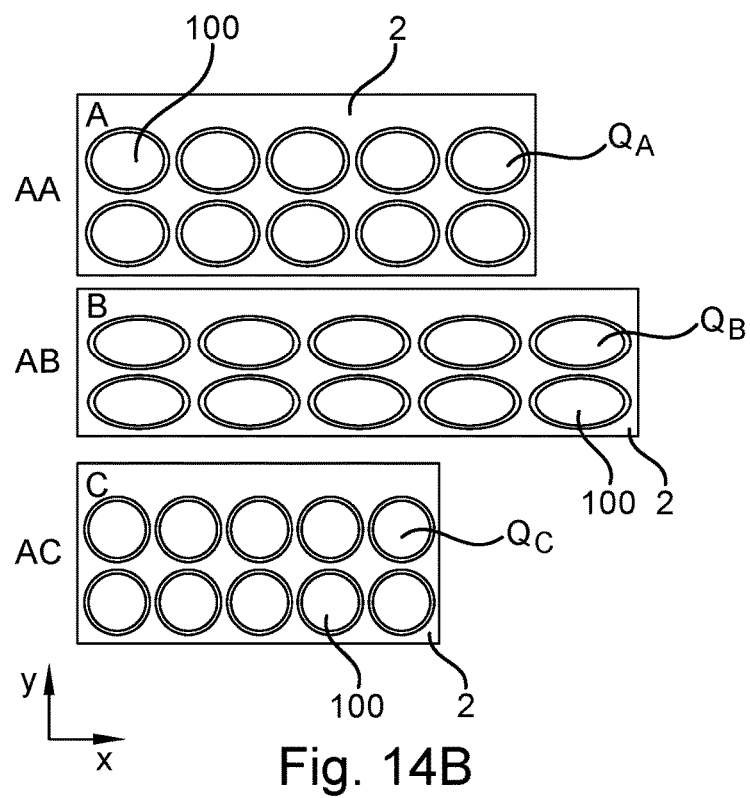
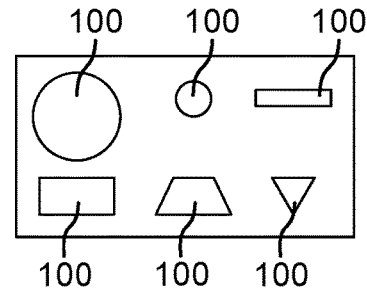
Fig. 14B
Fig. 14C

PART OF A GAS TURBINE ENGINE AND METHOD FOR THE MANUFACTURING THE PART

This application claims priority to German Patent Application 10 2021 214 605.8 filed Dec. 17, 2021, the entirety of which is incorporated by reference herein.

The invention relates to a component, and to a method for producing the component, having features as disclosed herein.

Many components of a gas turbine engine of an aircraft are subject to high mechanical structural requirements and at the same time to strict parameters in terms of weight. An example of such a component is a load-bearing guide vane in a gas turbine engine.

Metallic components have a high weight. Components from fiber-composite materials for meeting these requirements are known in principle. These requirements here cannot always be met by unidirectional or bidirectional fiber-composite materials.

There is, therefore, the object of achieving components which are improved in this respect.

The object is achieved by a component having features as disclosed herein.

Used herein is a component which comprises a fiber-composite material having a multiplicity of rovings.

Roving here fundamentally refers to a bundle, a strand or a multifilament yarn from filaments (continuous fibers) disposed in parallel. The cross section of a roving here may have various shapes, such as, for example, circular, elliptic or else approximately rectangular. It is known in principle that filaments from glass, aramid or carbon are combined so as to form rovings.

In the component, at least one roving of the fiber-composite material, along the spatial extent thereof, has a variable cross section, at least two rovings have in each case a dissimilar cross section, and/or the at least one roving follows a variable direction. In this way, the rovings along the profile thereof can have in each case variable and constant cross sections. There may also be different roving "packs" which have dissimilar cross sections. Additionally, a roving along the spatial extent thereof may also have a variable cross section, and follow a variable direction.

Since a roving represents a combination of yarns, said roving also has a spatial extent that may be linear in portions, for example, or be curved in portions. The cross sections, of which at least two have dissimilar shapes, in this instance lie perpendicularly to this spatial extent. This means, for example, that the at least one roving does not have a constant but a variable cross section, and/or may have a unidimensional or multidimensional profile. In this way, the component has a variable-axis fiber structure, for example, potentially having a variable cross section. In this way, the roving in one cross section can have a circular cross section, for example, and have an elliptic cross section in another cross section. This roving can be elongate or curved or have a variable axis.

Furthermore, the at least one roving is deposited by means of tailored fiber placement (TFP). In TFP, the fundamental principle of embroidery is utilized for fixing an additional functional material, presently the at least one roving, on an embroidery ground fabric.

Since the components in a gas turbine engine often have not only complex geometries but are also subject to complex mechanical stress, the use of at least one roving having variable cross sections can be adapted to the geometrical and mechanical conditions. The depositing of the at least one roving by means of TFP here simultaneously permits the desired cross section to be fixed as well as the disposal to take place according to the mechanical structural requirements.

A variable-axis fiber-composite structure of a component can thus serve for reproducing tailored fiber profiles, for example for the complex locally variable stress conditions induced in guide vanes. This thus offers a significant advantage in comparison to conventional fiber-composite structures having a unidirectional or bidirectional fiber profile.

In this way, components such as, for example, vanes for which only a small installation space is available can be achieved, in particular. This is often the case in compact gas turbine engines in executive aircraft, for example.

In one embodiment, the at least one roving is oriented along a direction of main stress of the component. A roving has a spatial extent that follows substantially a line. This line of the roving having a variable cross section can be readily adapted to the mechanical stresses.

In two sectional planes of the component, the shape and/or the face of the respective cross-sectional faces of the rovings here can be a function of the shape of the cross-sectional faces of the component, for example. Since the components, for example a guide vane, have complex cross sections, the latter can be formed or be adapted to by rovings having different cross sections.

The cross-sectional face of the at least one roving can also be substantially flat, rectangular having radiused corners, trapezoidal or wedge-shaped, for example.

Furthermore, the cross-sectional face of the roving can be configured so as to be substantially elliptic (including circular), for example, wherein the length of the semi-major axis of the cross-sectional faces is a function of the largest longitudinal extent of the component of the cross-sectional faces in the respective sectional plane. The more elongate the cross-sectional face of the component, the more elongate the elliptic cross sections of the rovings.

It is also possible that in at least two sectional planes of the component the ratio between the cross-sectional faces of the rovings and the cross-sectional faces of the component is constant.

In one embodiment, the component is configured as a vane, in particular a guide vane. Such a component, in particular when the latter is disposed as a load-bearing vane in an intermediate casing structure of a gas turbine engine, must withstand substantial mechanical stress, so that the reinforcement as a result of the variable-axis rovings is of importance.

In one embodiment of the component, the latter in the fiber-composite is connected to at least one further construction element. In this way, the rovings having variable cross sections may extend not only to the actual component but also include adjoining construction elements. In this way, for example on a vane structure as the component, platforms or flanges for connecting to the gas turbine engine can be produced integrally in the fiber composite, the orientation of the rovings being able to be adapted to the specific load in the component and the further construction element.

It is inter alia possible here that the at least one construction element has at least one connecting element or is able to be connected to at least one connecting element. A connecting element can be, for example, a bore which can received a screw connection or rivet connection. In particular, the at least one connecting element here can have a reinforcing means and/or the rovings in the region of the at least one connecting element are adapted to the shape of the latter.

Provided in one further embodiment is a transitional region which at least partially, but in particular on all sides, extends about a vane structure and wherein the transitional region connects the vane structure to a platform and the connection is established in particular at an angle between 60 and 120°, in particular at 90°. The rovings here extend from the vane structure, across the transitional region, into the platform.

The at least one further construction element, in particular a platform, here can have a closure layer from fibrous material, in particular having an isotropic layer construction or a fiber orientation from one longitudinal side of the platform to the other. The fibers from the actual component, for example the vane structure, run into the platform at an angle. The closure layer here terminates raised fibers, for example.

In particular in the case of a raised surface, cavities can form in the region between the vane structure and the construction element (for example, the platform), a filler material which comprises in particular unidirectional fibers and/or a braided fabric being disposed in said cavities in one embodiment.

A vane can also be connected to the construction element, in particular a platform, by way of a polymer-adhesive connection and/or a metallic connecting means.

In order to provide additional protection in relation to mechanical stress, in one embodiment a metallic component can be used as a protective face on particularly stressed faces.

The component can be disposed in a gas turbine engine, for example, wherein the gas turbine engine is configured in particular as a turbofan engine.

The object is also achieved by a method having features as disclosed herein.

At least one roving of a fiber-composite material along the spatial extent thereof, while being deposited by means of tailored fiber placement, is imparted a variable cross section, the at least two rovings have in each case a dissimilar cross section and/or the at least one roving follows a variable direction.

The variable cross section can in particular be achieved during depositing by a variation in the roving tension, by a variation of the fiber density in the roving, by a variation of the embroidery thread position, and/or by a variation of the roving routing prior to embroidering. For example, the shape and/or the size of the cross-sectional face of the roving changes when the fibers are dissimilarly pulled or compressed during depositing by the TFP method.

In one embodiment, the at least one roving can be deposited along a direction of main stress of the component.

The cross-sectional faces of the rovings here can be shaped such, for example, that said cross-sectional faces in at least two sectional planes of the component are a function of the shape of the cross-sectional faces of the component.

In particular, the cross-sectional face of the roving can be configured so as to be substantially elliptic, wherein the length of the semi-major axis of the cross-sectional faces is a function of the largest longitudinal extent of the component in the sectional plane.

In one embodiment, in at least two cross sections of the component the ratio between the cross-sectional faces of the at least one roving (100) and the cross-sectional faces of the component is constant.

The invention will be explained in conjunction with the exemplary embodiments illustrated in the figures. In the figures.

Figure 4:
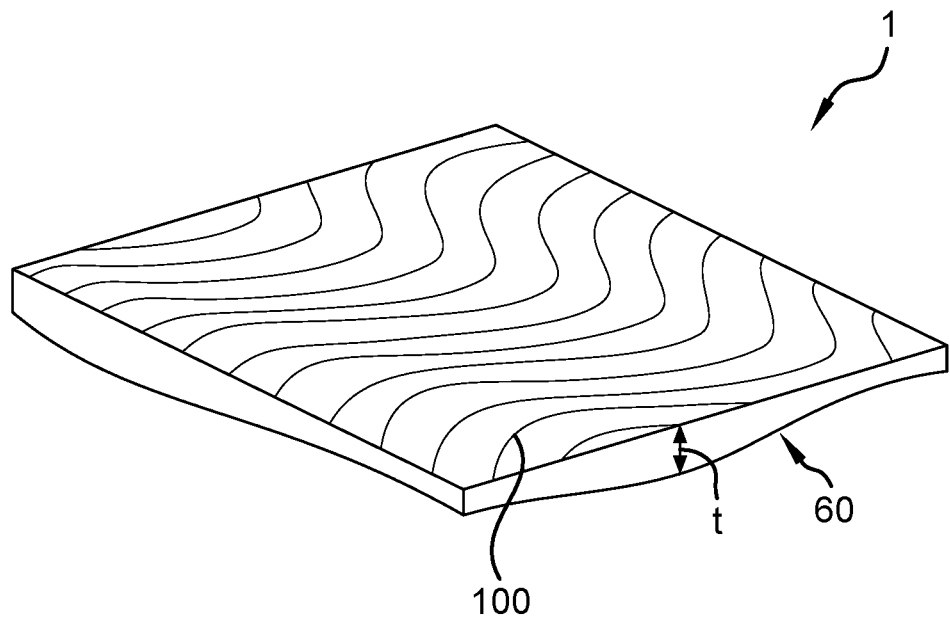
Figure 5:
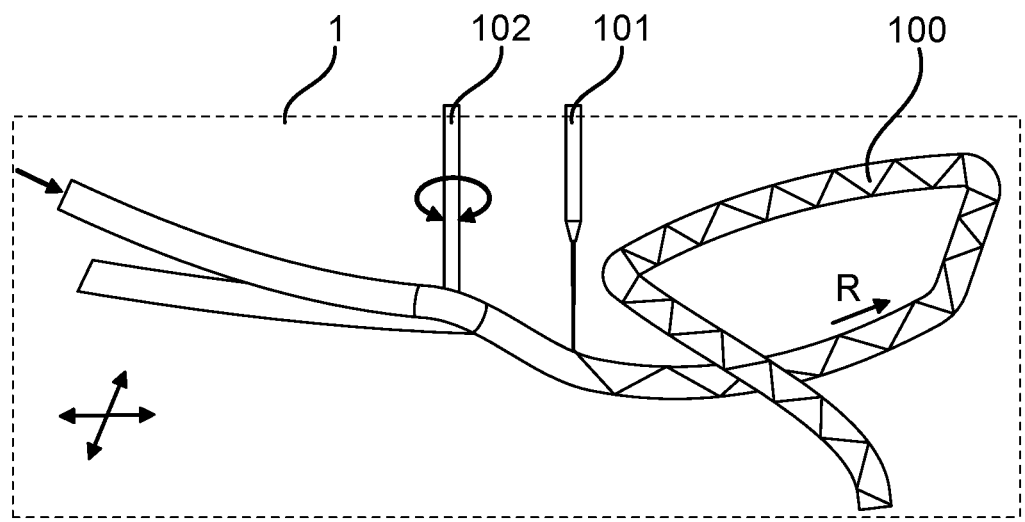
Figure 8:
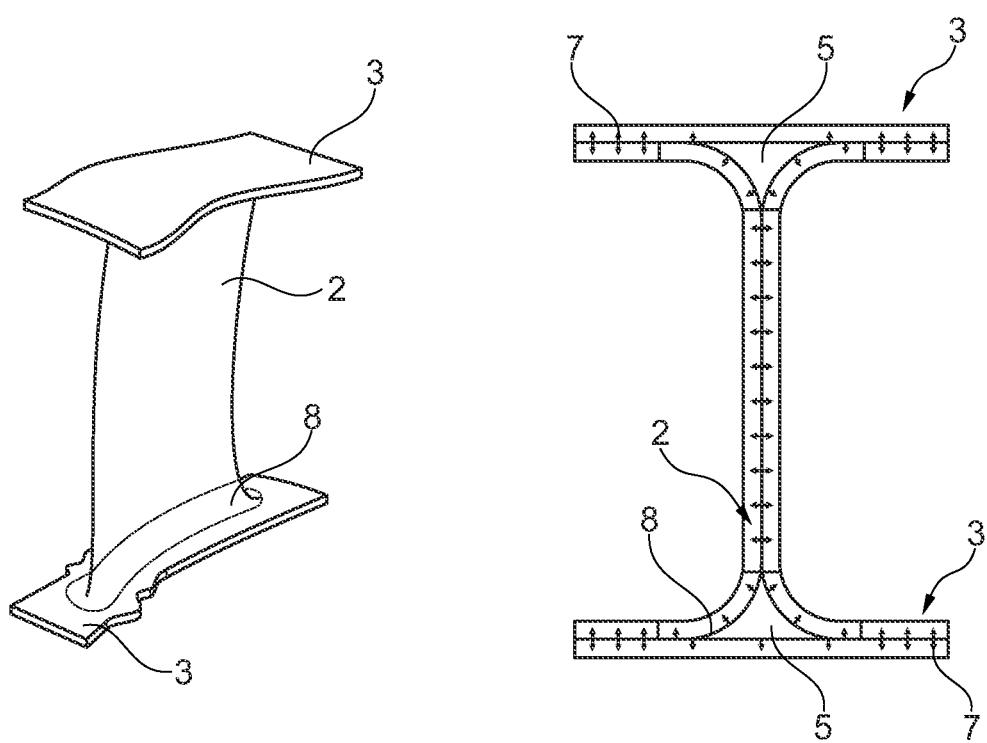
Figure 9:
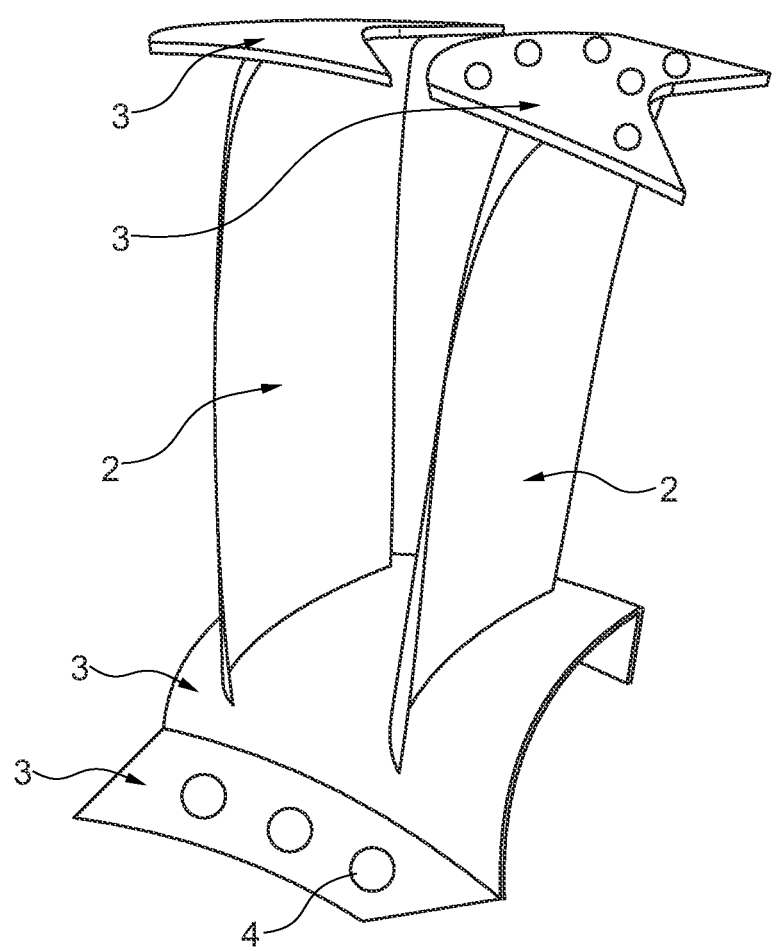
Figure 10:
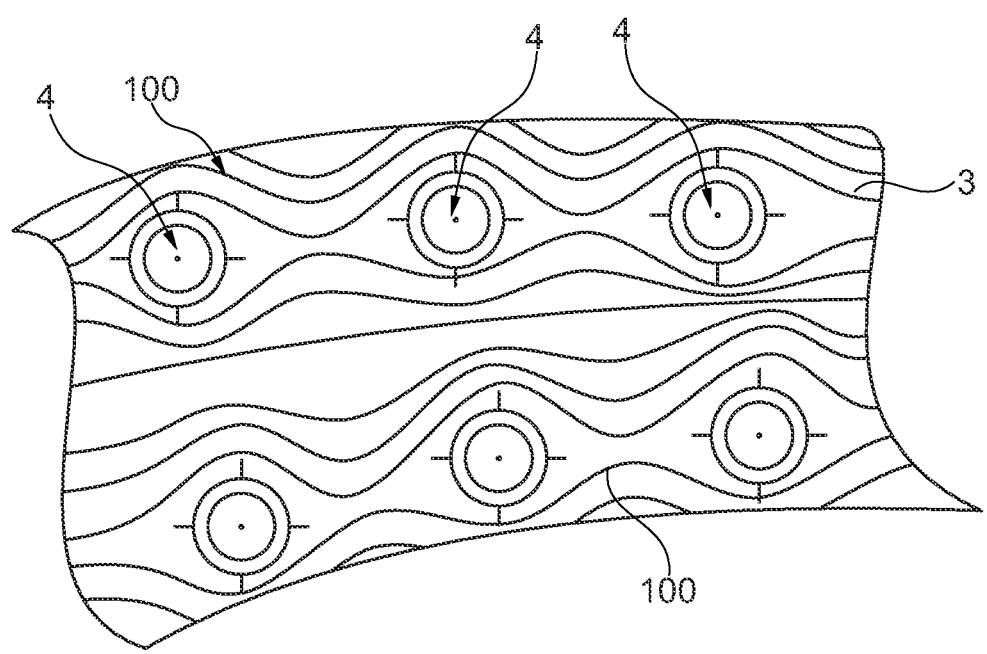
Figure 11:
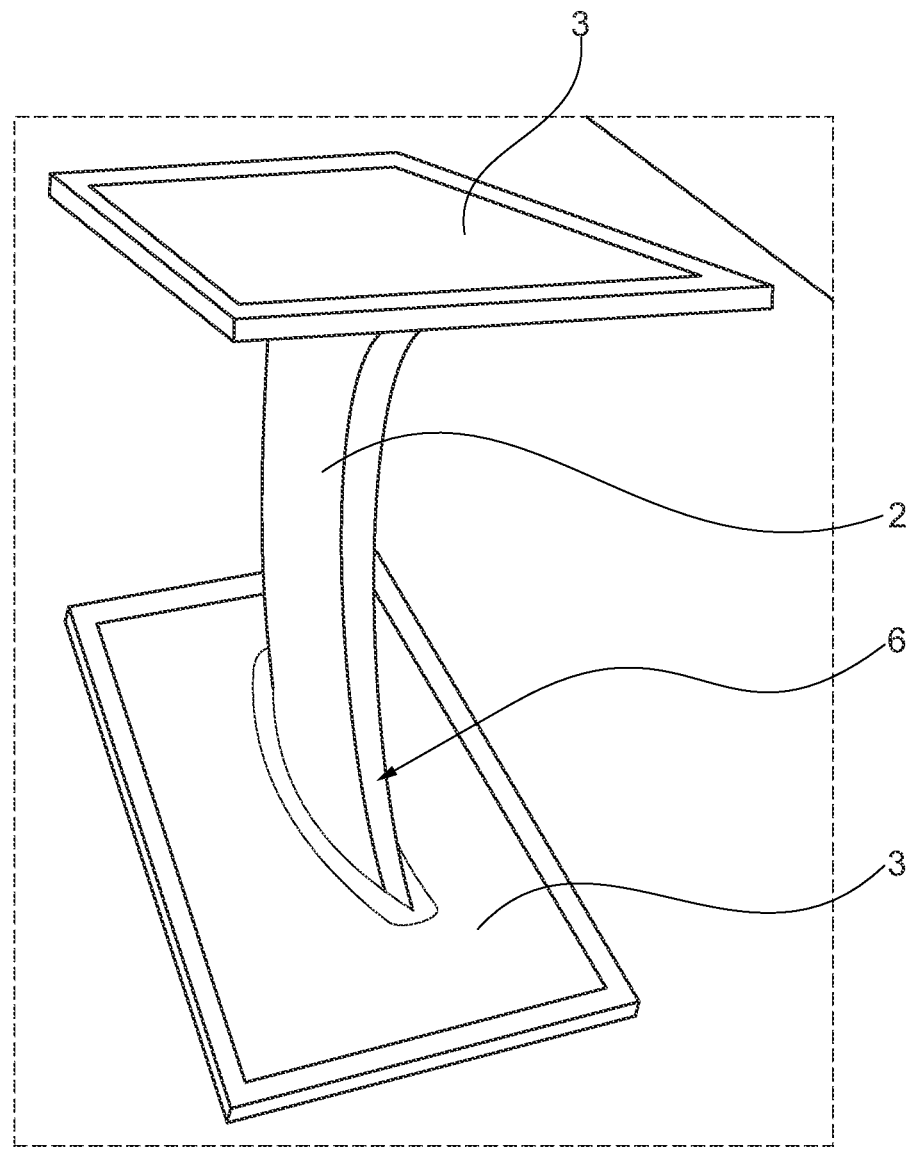
Figure 12:
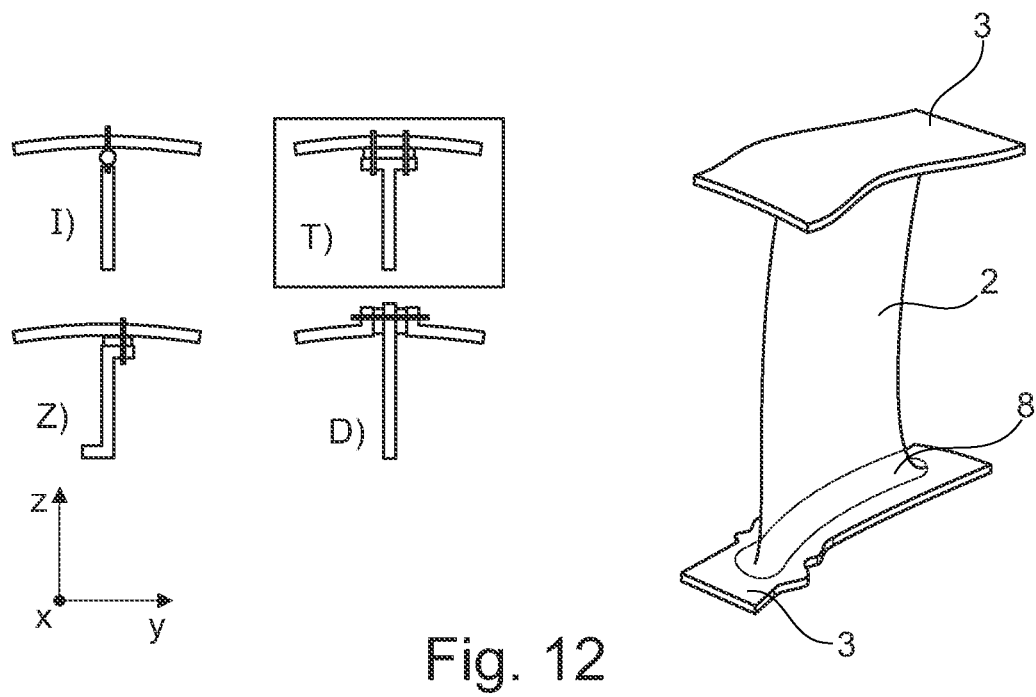
Figure 13:
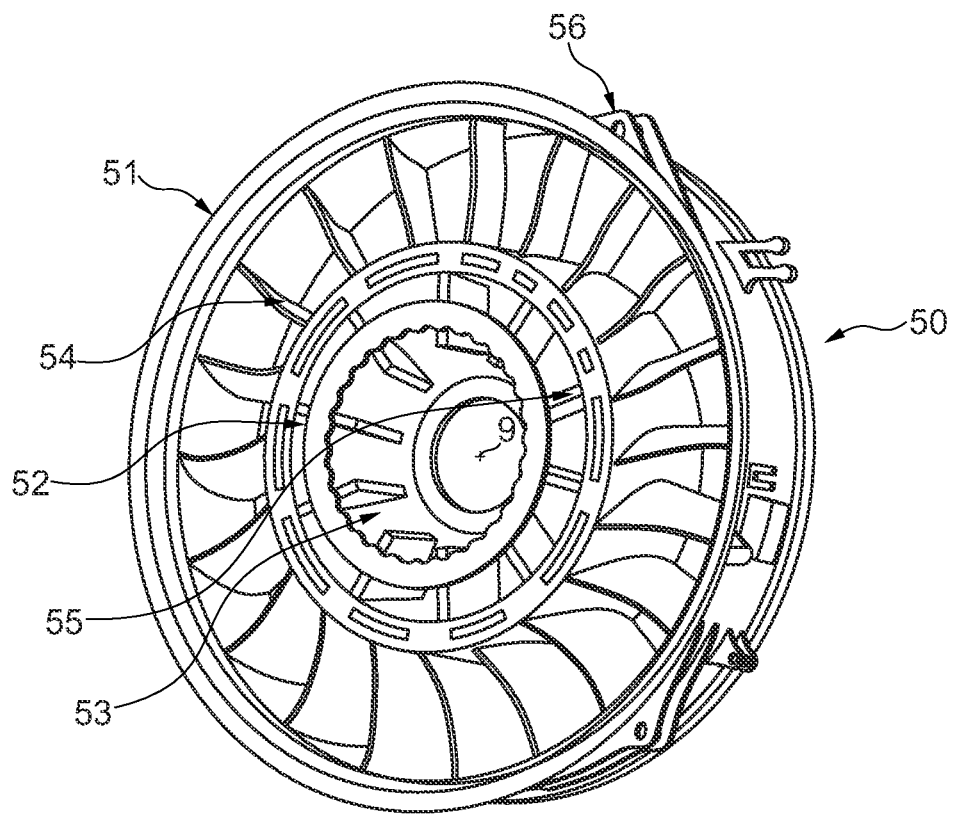

FIG. 4 schematically shows the fundamental construction of a variable-axis fiber-composite construction;

FIG. 5 schematically shows a TFP (tailored fiber placement) method for depositing rovings;

FIG. 6 shows a perspective view of a guide vane, as an example of a component having a fiber profile optimized by rovings;

FIG. 7 shows a further perspective view of the guide vane from FIG. 6;

FIG. 7A shows a sectional view of the guide vane in the plane A-A of FIG. 7;

FIG. 8 shows (on the left) a guide vane having platforms, and a vertical sectional view (on the right) shows a guide vane having different fiber layers;

FIG. 9 shows a perspective view of an embodiment of a double vane;

FIG. 10 schematically shows a component having a fiber profile about bores;

FIG. 11 shows in a perspective view an embodiment of a guide vane as a component having a metallic leading edge;

FIG. 12 shows embodiments of attachments of a vane structure to a platform;

FIG. 13 shows an embodiment of an intermediate casing structure having load-bearing guide vanes;

FIG. 14 shows a perspective view of a guide vane having three horizontal sectional planes;

FIG. 14A shows a sectional view along the plane A-A;

FIG. 14B shows three schematic sectional views, each having rovings with variable cross sections; and FIG. 14C shows schematic sectional views of rovings with different cross sections.

Figure 1:
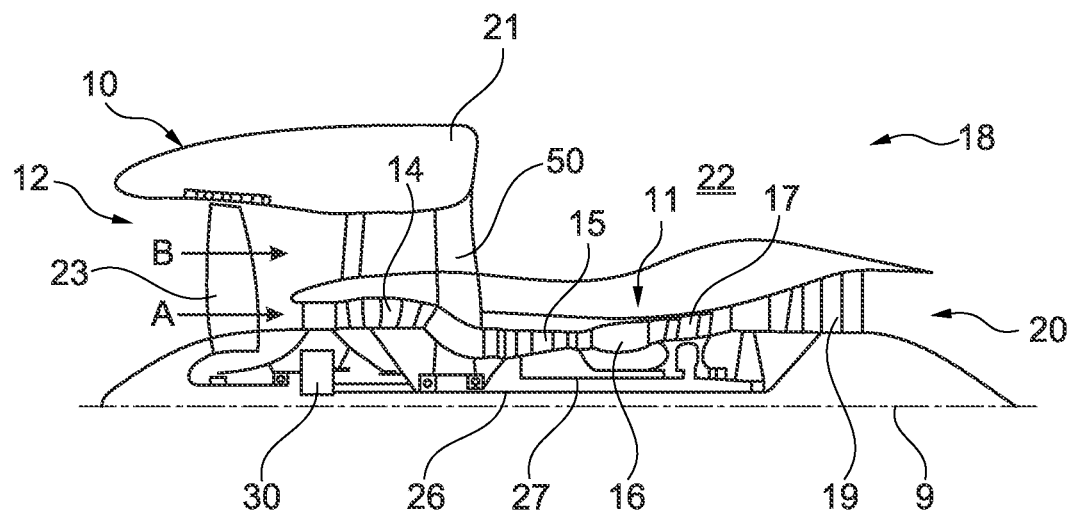
FIG. 1 shows a lateral sectional view of a gas turbine engine.
Figure 2:
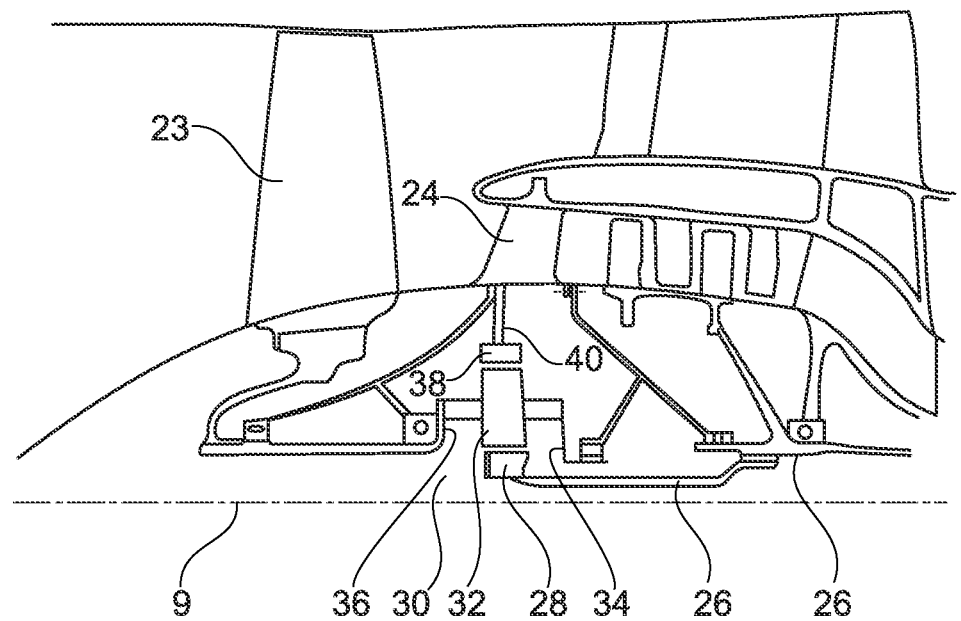
FIG. 2 shows a close-up sectional side view of an upstream portion of a gas turbine engine.
Figure 3:
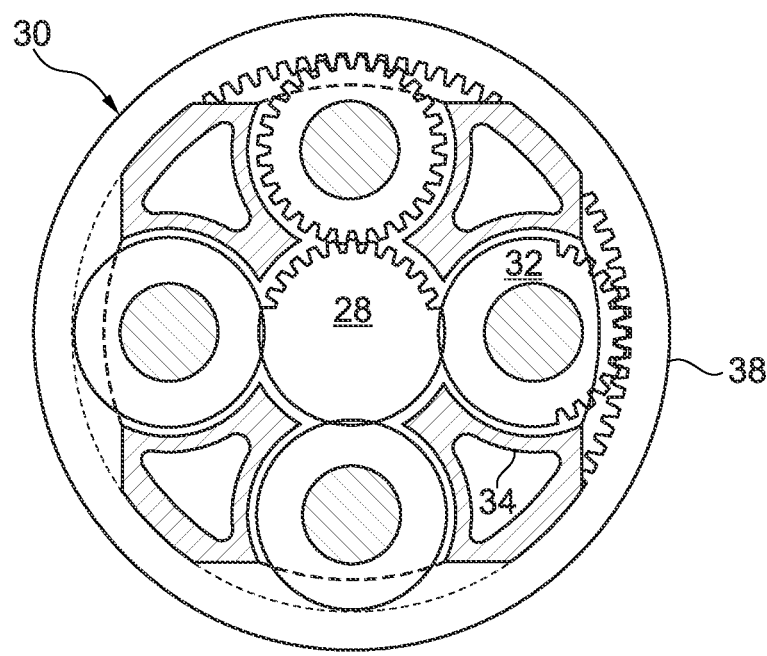
FIG. 3 shows a partially cut-away view of a gear mechanism for a gas turbine engine.

Prior to discussing details of components 1 having a particular roving structure, the technical context of a gas turbine engine 10, in which the components 1 are used, will first be illustrated by means of FIGS. 1 to 3.

FIG. 1 illustrates a gas turbine engine 10 having a main rotation axis 9. The gas turbine engine 10 comprises an air inlet 12 and a fan 23 which generates two air flows: a core air flow A and a bypass air flow B. The gas turbine engine 10 comprises a core 11 which receives the core air flow A. When viewed in the order corresponding to the axial direction of flow, the core engine 11 comprises a low-pressure compressor 14, a high-pressure compressor 15, a combustion device 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 is, in this embodiment, attached to and driven by the low-pressure turbine 19 via a shaft 26 and an epicyclic planetary gear box 30. However, the use of a planetary gear box is not mandatory by any means.

During operation, the core air flow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resulting hot combustion products then propagate through the high-pressure and low-pressure turbines 17, 19 and thereby drive said turbines, before being expelled through the nozzle 20 to provide a certain thrust force. The high-pressure turbine 17 drives the high-pressure compressor 15 by way of a suitable connecting shaft 27. The fan 23 generally provides the major part of the thrust force. The epicyclic planetary gear box 30 is a reduction gear box.

An intermediate casing structure 50, the function of which is described in more detail in connection with FIGS. 4 to 8, is arranged axially at the exit from the engine nacelle 21. In other embodiments, the engine nacelle 21 may extend axially over the region of the low-pressure compressor 14 up to the region of the high-pressure turbine 17.

An exemplary arrangement for a geared fan gas turbine engine 10 is shown in FIG. 2. The low-pressure turbine 19 (see FIG. 1) drives the shaft 26, which is coupled to a sun gear 28 of the epicyclic planetary gear box 30. Multiple planet gears 32, which are coupled to one another by a planet carrier 34, are situated radially to the outside of the sun gear 28 and mesh therewith. The planet carrier 34 guides the planet gears 32 in such a way that they circulate synchronously around the sun gear 28, whilst enabling each planet gear 32 to rotate about its own axis. The planet carrier 34 is coupled via linkages 36 to the fan 23 in order to drive its rotation about the engine axis 9. An external gear or ring gear 38 that is coupled via linkages 40 to a stationary support structure 24 is situated radially to the outside of the planet gears 32 and meshes therewith.

Note that the terms "low-pressure turbine" and "low-pressure compressor", as used herein, may be taken to mean the turbine stage with the lowest pressure and the compressor stage with the lowest pressure (that is to say not including the fan 23), respectively, and/or the turbine and compressor stages which are connected together by the interconnecting shaft 26 with the lowest rotational speed in the engine (that is to say not including the gear box output shaft which drives the fan 23). In some documents, the "low-pressure turbine" and the "low-pressure compressor" referred to herein may alternatively be known as the "intermediate-pressure turbine" and "intermediate-pressure compressor". Where such alternative nomenclature is used, the fan 23 may be referred to as a first, or lowest-pressure, compression stage.

The epicyclic planetary gear box 30 is shown in greater detail by way of example in FIG. 3. The sun gear 28, planet gears 32 and ring gear 38 in each case comprise teeth on their periphery to allow meshing with the other toothed gears. However, for clarity, only exemplary portions of the teeth are illustrated in FIG. 3. Although four planet gears 32 are illustrated, it will be apparent to a person skilled in the art that more or fewer planet gears 32 may be provided within the scope of protection of the claimed invention. Practical applications of an epicyclic planetary gear box 30 generally comprise at least three planet gears 32.

The epicyclic planetary gear box 30 illustrated by way of example in FIGS. 2 and 3 is a planetary gear box in which the planet carrier 34 is coupled to an output shaft via linkages 36, with the ring gear 38 being fixed. However, any other suitable type of planetary gear box 30 may be used. As a further example, the planetary gear box 30 may be a star arrangement, in which the planet carrier 34 is held fixed, with the ring gear (or external gear) 38 being allowed to rotate. In such an arrangement, the fan 23 is driven by the ring gear 38. As a further alternative example, the gear box 30 may be a differential gear box in which both the ring gear 38 and the planet carrier 34 are allowed to rotate.

It is self-evident that the arrangement shown in FIGS. 2 and 3 is merely an example, and various alternatives fall within the scope of protection of the present disclosure.

Purely by way of example, any suitable arrangement may be used for positioning the gear box 30 in the gas turbine engine 10 and/or for connecting the gear box 30 to the gas turbine engine 10. As a further example, the connections (for example the linkages 36, 40 in the example in FIG. 2) between the gear box 30 and other parts of the gas turbine engine 10 (such as for example the input shaft 26, the output shaft and the fixed structure 24) may have a certain degree of stiffness or flexibility. As a further example, any suitable arrangement of the bearings between rotating and stationary parts of the gas turbine engine 10 (for example between the input and output shafts of the gear box and the fixed structures, such as for example the gear-box casing) may be used, and the disclosure is not limited to the exemplary arrangement in FIG. 2. For example, where the gear box 30 has a star arrangement (described above), a person skilled in the art would readily understand that the arrangement of output and support linkages and bearing positions would usually be different from that shown by way of example in FIG. 2.

Accordingly, the present disclosure extends to a gas turbine engine having any arrangement of gear box types (for example star-shaped or epicyclic-planetary), support structures, input and output shaft arrangement, and bearing positions.

Optionally, the gear box may drive additional and/or alternative components (for example the intermediate-pressure compressor and/or a booster compressor).

Other gas turbine engines in which the present disclosure can be used may have alternative configurations. For example, such engines may have an alternative number of compressors and/or turbines and/or an alternative number of connecting shafts. As a further example, the gas turbine engine shown in FIG. 1 has a split flow nozzle 20, 22, meaning that the flow through the bypass duct 22 has its own nozzle, which is separate from and radially outside the engine core nozzle 20. However, this is not restrictive, and any aspect of the present disclosure can also apply to engines in which the flow through the bypass duct 22 and the flow through the core 11 are mixed or combined before (or upstream of) a single nozzle, which may be referred to as a mixed flow nozzle. One or both nozzles (whether mixed or split flow) can have a fixed or variable region. In some arrangements, the gas turbine engine 10 potentially does not comprise a gear box 30.

The geometry of the gas turbine engine 10, and components thereof, is/are defined by a conventional axis system, which comprises an axial direction (which is aligned with the rotation axis 9), a radial direction (in the direction from bottom to top in FIG. 1), and a circumferential direction (perpendicular to the view in FIG. 1). The axial, radial and circumferential directions are perpendicular to one another.

Accordingly, in particular different compressors 14, 15, and turbines 17, 19 are disposed in the gas turbine engine 10, said compressors 14,15 and turbines 17, 19 having in each case guide vanes and rotor vanes. Embodiments of such vanes as the component 1 will be discussed hereunder, which are understood to be by way of example only.

A component (guide vane) 1 which has surfaces of complex contours is schematically illustrated in FIG. 4. The thickness t is also of dissimilar configuration at different locations. This component 1 is constructed as a monolithic fiber-composite body 60. Rovings 100, which assume correspondingly complex profiles in accordance with mechanical stress of the component 1, are schematically disposed here.

The production of such complex profiles of a roving 100 by means of the tailored fiber placement (TFP) method known in principle is illustrated in FIG. 5.

A component 1 (only partially illustrated here) is moved in space in the process, as is indicated by the arrows On the right in FIG. 5, a roving 100 has already been fixed on the component 1 by way of an embroidery needle device 101. To this end, the roving by means of a roving guide 102, which is of movable configuration, is deposited on the component 1 such that the embroidery needle device 101 can fix the roving 100 on the component. As can be seen, the roving 100 can be imparted a complex geometric design such that the roving 10 can be deposited in accordance with the mechanical stress of the component 1.

The structure of the ravings 100, in particular a variable cross section along a spatial extent R (see arrow in FIG. 5) is yet to be explained in the context of FIG. 15.

However, it is to be noted already here that the cross-sectional face QA, QB, QC is adjustable in a targeted manner during depositing of the roving 100. The variable cross section can in particular be achieved during depositing by a variation in the roving tension, by a variation of the fiber density in the roving 100, by a variation of the embroidery thread position and/or a variation of the roving routing prior to embroidering. For example, the shape and/or the size of the cross-sectional face of the roving changes when the fibers are dissimilarly pulled or compressed during depositing by the TFP method.

Illustrated in FIG. 6 is a real component, specifically a guide vane from a gas turbine engine 10. The guide vane here has a vane structure (aerodynamic vane) 2, which has the actual aerodynamic effect. The vane structure 2 here is a component which is connected to platforms 3 as further construction elements. The vane structure 2 by way of the platforms can be connected to other parts (not illustrated here) of the gas turbine engine 10.

The component, here the vane structure 2, has a multiplicity of rovings 100 which are deposited according to the mechanical stress of the vane structure 2 and in different directions, or else having dissimilar densities. In this way, the density of the rovings 100 at the front part of the base of the vane structure 2 is higher than in other parts, for example. Here, the rovings 100 by way of a transitional region 8 run into the lower platform 3.

In this way, the fiber composite of the component 1 (here of the vane structure 2) transitions to a fiber composite of the platform 3 such that a uniform fiber composite part is present. The fibers of the individual layers run from the upper platform 3, through the vane structure 2, into the lower platform 3 such that a consistent flow of flux is enabled.

The platforms 3 here are disposed about the vane structure 2 on all sides such that there is an encircling transitional region in which a fiber structure of rovings 100 connects the parts to one another. In other embodiments, the transitional region is not all-encompassing. In the embodiment illustrated, the platforms 3 are also disposed so as to be substantially orthogonal to the vane structure 2, i.e. if the vertical direction of extent of the vane structure is used as the reference axis. In other embodiments, the platform 3, or a further construction element 3, can be disposed at an angle between 60° and 120°.

Disposed in the further construction elements of the platforms 3 are bores as connecting elements 4, the latter yet to be discussed later.

Such a guide vane 1 can be disposed as a load-bearing vane in an intermediate casing structure 50 of a gas turbine engine 10, for example, as is yet to be explained by means of FIG. 13.

Another view of the guide vane 1 from FIG. 6 is illustrated in FIG. 7, wherein a horizontal sectional plane A-A is plotted. The section A-A is illustrated in FIG. 7A, where the relatively thin vane structure 2 on the platform 3 is illustrated.

A perspective view of a guide vane 1, in which a vane structure 2 at the top and the bottom is delimited by a platform 3, is illustrated on the left in FIG. 8, as in FIG. 7. The platforms 3 are connected to the vane structure 2 by way of a transitional region 8.

A vertical sectional view through the component 1 depicted on the left is illustrated on the right in FIG. 8.

Present in the region of the vane structure 2 is a fiber composite which has rovings 100 having variable-axis cross sections QA, QB, QC, as will yet to be explained in the context of FIG. 14.

The platform 3 in the distal parts here has fiber composites which are configured so as to be symmetrical in multiple axes (symbolized by a double arrow). In those parts of the platforms 3 that are relatively close to the vane structure, i.e. in the transitional region 8, the fiber composites are configured so as to be asymmetrical in multiple axes (symbolized by a single arrow).

The fibers of the vane structure 2 that are raised in the platforms 3 are covered by a closure layer 7 such that the transitional region which develops under tensile stress is not extracted in the process. The closure layer 7 here can have an isotropic layer construction, but preferably has a fiber orientation from one longitudinal platform side to the other (90°).

As a result of the transition of the raised fiber structure from the vane structure 2 into the platform 3, a region in the interior of the component is obtained, said region being completely filled with a transversal isotropic filler material 5. The filler material 5 here in the thickness direction has a similar stiffness as the surrounding fiber-composite material. The filler material 5 here may comprise unidirectional fibers or a braided fabric, or be composed of these materials, for example.

A variant of an embodiment according to FIG. 6 or 8, specifically a double guide vane, is illustrated in FIG. 9. The component here has two vane structures 2 which at the bottom are conjointly connected to a platform 3. At the upper end, the two vane structures 2 are individually connected to platforms 3.

These connections between the vane structures 2 and the platforms are again established as has been illustrated in the context of FIG. 6 or 8, in that rovings 100 (not illustrated here) by way of the vane structure 2 transition from one platform 3 into a further platform 3. In this way, the vane structure 2 is connected to the platforms 3 by way of a uniform fiber-composite structure—by way of the rovings 100 mentioned.

A further construction element in the form of a flange is disposed on the lower platform 3. Bores as connecting elements 4 are disposed in the flange. Likewise, the upper platforms 3 also have connecting elements in the form of bores. The bores can receive, for example, screw connections, pins, HiLocks, adhesive connections or rivet connection (not illustrated here) by way of which the double guide vane can be connected to adjacent parts of the gas turbine engine 10.

The connecting elements 4 here are designed such that, for example, screw heads or rivet heads terminate flush with the surface so that an airflow is not affected or ideally affected to a minimum degree.

In order for the pullout resistance and the hole strength of the laminated fiber composite in the component to be increased, reinforcements in the form of 3D fibers or metal sheets, preferably titanium, are disposed about the connecting elements 4 in the platform or the flange 3.

The fiber profiles in the region of the high-load zones of the attachment geometry, i.e. flanges, platforms and bore, can be designed in an optimal manner with the aid of TFP manufacturing technology. For example, the fibers can be guided in a targeted manner about the positions of bores so as to avoid interruptions in fibers and to introduce/discharge loads in an optimal manner. It can be reduced in this way that the properties of the mechanical structure are weakened.

This fiber routing with the rovings 100 about the bores is illustrated in FIG. 10.

A variant of the guide vane according to the embodiment in FIG. 6 or 8 is illustrated in FIG. 11. The leading edge of the vane structure 2 here is provided with a metallic component 6 in order for the composite material of the vane structure 2 to be protected in relation to very high temperatures. In this way, the vane structure 2 is protected in relation to thermal influences. Additionally or alternatively, a component can also be protected in relation to mechanical influences by way of a metallic component 6.

A guide vane as in FIG. 6 or 8 is again illustrated on the right in FIG. 12. Illustrated to the left thereof are four different variants of the attachment of the vane structure 2 to the platform 3, i.e. In addition to the measures described so far.

A combination of metallic connecting elements (e.g. screw connections) and an adhesive polymer connection may be present in all four variants.

In variant "I", part of the vane structure 2 abuts the platform and is correspondingly connected.

In variant "T", the vane structure 2 at the upper end has a T-fitting so that there is more space for connecting means.

In variant "Z", a horizontal element is disposed on the upper and the lower end of the vane structure so that there is in each case more space for attaching connecting means.

In variant "D", the tip of the vane structure 2 is routed from below through the platform 3 so that a connection in the horizontal direction is possible.

FIG. 13 here describes the fundamental construction of an intermediate casing structure 50. Three rings, the outer ring 51, the central ring 52, and the inner ring 53, are disposed so as to be concentric about the main rotation axis 9. Vane rows 54, 55 (stators), specifically the outer vanes 54 and the inner vanes 55, extend radially between the rings 51, 52, 53. A row of fastening elements 56, to which a hook can be fastened for assembling, for example, is disposed on the outer circumference of the outer ring 51.

The outer vanes 54 have an incident flow of air, the latter being conveyed through the bypass duct 22 by the fan 23. The outer vanes 54 serve to guarantee an efficient flow of air out of the bypass thrust nozzle 18.

The inner vanes 55 likewise have an incident flow of the bypass airflow B, wherein the airflow is directed into the high-pressure compressor 15 by the inner vanes 54. Depending on the construction mode of the gas turbine engine 10, different arrangements of rings 51, 52, 53 and of vane rows 54, 55 are possible in principle.

The inner vane 54 and the outer vane 55 in the embodiment illustrated is of a single-row configuration. The vanes 54, 55 here are all configured so as to be of identical size (i.e. length), wherein mechanical loads can also be transmitted from the inner ring 53 to the outer ring 51 by way of the central ring 52.

For the purpose of a balanced ratio between strength and an ideally low mass of the intermediate casing structure 50, the vane rows 54, 55 as the first component in the embodiment illustrated are produced from a composite material, in particular a fiber-composite material and embodied according to the embodiments of FIGS. 4 to 12, i.e. having rovings 100 (not illustrated here) with a variable cross section.

The vane rows 54, 55 during operation are exposed above all to aerodynamic forces. This material is light but also capable of bearing mechanical loads.

Second components, such as the central ring 52 and the inner ring 53, for example, can be constructed from metal. These components are subject to mechanical stress such as, for example, torsional stress, during operation.

It is illustrated in FIGS. 14, 14A and 14B in which shape rovings 100 of the fiber-composite material have a variable cross section QA, QB, QC along the spatial extent R. It has been illustrated in FIG. 2 how such dissimilar cross sections QA, QB, QC can be generated.

FIG. 14 showed a perspective view of a guide vane 1 as has been illustrated in the context of FIG. 6 or 8, for example. Therefore, reference may be made to the corresponding description.

The component 1, i.e. the guide vane, has a vane structure 2 and two platforms 3, the guide vane 1 by way of the latter being able to be connected to surrounding parts of the gas turbine engine 10. Connecting elements 4 in the manner described above are illustrated in the lower platform 3.

A cross section through the vane structure 2 in the plane A-A is illustrated in FIG. 14A.

However, a total of three planes A-A, B-B, C-C, which lie at different vertical heights of the vane structure 2, are illustrated in FIG. 14. The rovings 100 (not illustrated here) run in a complex manner as is illustrated in the view of FIG. 6, i.e. said rovings 100 having been deposited by means of the TFP method, so as to be adapted to the load, on the vane structure 2. The rovings 100 can in particular be disposed along a direction of main stress.

The three horizontal sections A, B, C, in which the rovings 100 have in each case dissimilar cross sections QA, QB, QC, are schematically illustrated in FIG. 14B.

The cross sections AA, AB, AC through the vane structure 2 here are illustrated in a simplified manner as rectangles, wherein the rectangles here have identical faces but different length-to-width ratios. The length here is measured in the x-direction, while the width here is measured in the y-direction.

In reality, it is not mandatory for the sizes of the faces of the horizontal sections through the vane structure 2 to be identical.

In the embodiment illustrated, the cross section AB has the largest length-to-width ratio, while the cross section AC has the smallest.

The cross sections QA, QB, QC of the rovings 100 here are configured as ellipses, this including a circular cross section as an ellipse having identical semi-axes.

When following the rovings 100 in the vane structure 2 from the top (i.e. from the cross section AA) toward the bottom (i.e. to the cross section AC), it can be seen that the rovings 100 along the spatial extent thereof in the vane structure 2 have variable cross sections QA, QB, QC. An ellipse having a comparatively minor eccentricity is present in the upper cross section AA.

The cross section AB lying below is more elongate. Accordingly, the cross sections QB of the rovings 100 are also adapted thereto in that the elliptic cross sections have higher degrees of eccentricity.

A relatively compressed cross section AC is present in the lowermost cross section AC. Accordingly, the rovings 100 have in each case an elliptic cross section QC without eccentricities, i.e. a circular cross section QB is present.

In this way, the shape of the cross-sectional faces QA, QB, QC of the rovings 100 in different sectional planes AA, AB, AC is a function of the shape of the cross-sectional faces AA, AB, AC of the component, here of the vane structure 2. In this way, the rovings 100 can be adapted according to the stress not only in terms of the depositing geometries, but also in a further dimension, specifically the thickness or the shape of the roving 100.

As opposed to structures having a unidirectional or bidirectional fiber composite, it is thus not necessary that a variable structural cross section has to be filled by adding or omitting rovings. The cross sections QA, QB, QC which are variable in the direction of extent R contribute toward a variable construction space being able to be filled. The rovings 100 in the exemplary embodiment illustrated here run largely through the entire structure of the component 1, this leading to a consistent transmission of load. The rovings 100 are adapted in such a way that the corresponding cross sections are filled.

This exemplary embodiment also shows that the length of the semi-major axis of the cross-sectional faces QA, QB, QC is a function of the largest longitudinal extent (span) of the component 1 in the respective cross-sectional face AA, AB, AC.

It is also possible but not mandatory that the ratio between the cross-sectional faces QA, QB, QC of the rovings 100 and the cross-sectional faces AA, AB, AC of the component 1 is constant in at least two sectional planes of the component 1, e.g. of a vane structure 2.

In the example illustrated here, the cross sections QA, QB QC of the rovings 100 among one another in one sectional place AA, AB, AC are identical. This is not mandatory because the rovings 100 in other embodiments can have, for example, cross sections QA, QB, QC which are variable along the length (x-direction).

It is thus possible in particular to use rovings 100, wherein the cross sections QA, QB, QC are of dissimilar sizes and/or dissimilar shapes in at least two rovings 100. The cross sections QA, QB, QC may remain constant or else be variable along the spatial extent R of the respective rovings 100.

LIST OF REFERENCE SIGNS

1 Component, vane
2 Vane structure (airfoil)
3 Construction element (platform, flange)
4 Connecting element
5 Filler material
6 Metallic component
7 Closure layer
8 Transitional region
9 Main rotation axis
10 Gas turbine engine
11 Core engine
12 Air inlet
14 Low-pressure compressor
15 High-pressure compressor
16 Combustion device
17 High-pressure turbine
18 Bypass thrust nozzle
19 Low-pressure turbine
20 Core thrust nozzle
21 Engine nacelle
22 Bypass duct
23 Fan
24 Stationary support structure
26 Shaft
27 Connecting shaft
28 Sun gear
30 Gear box
32 Planet gears
34 Planet carrier
36 Linkage
38 Ring gear
40 Linkage
50 Intermediate casing structure in a gas turbine engine
51 Outer ring of intermediate casing structure
52 Central ring of intermediate casing structure
53 Inner ring of intermediate casing structure
54 Outer vane row of the intermediate casing structure
100 Roving
101 Embroidery needle device of the TFP process
102 Roving routing of the TFP process
A Core air flow
B Bypass air flow
AA First cross section of a component
AB Second cross section of a component
AC Third cross section of a component
QA First cross section of a roving
QB Second cross section of a roving
QC Third cross section of a roving
R Direction of extent of the roving

The invention claimed is:

1. A method for producing a component of a gas turbine engine, comprising:
   providing:
      a substrate;
      a fiber-composite material having a plurality of rovings, and
      at least one chosen from:
         at least one of the plurality of rovings, along a spatial extent thereof, having a variable cross section prior to depositing on the substrate, and
         at least two of the plurality of rovings each having a dissimilar cross section as compared to one another prior to depositing on the substrate,
      wherein the at least one chosen from the at least one of the plurality of rovings and the at least two of the plurality of rovings are deposited on the substrate via tailored fiber placement, and the variable cross section or the dissimilar cross-sections are achieved during depositing by a variation in tension with respect to the substrate imparted on the at least one of the plurality of rovings or the at least two of the plurality of rovings.

2. The method according to claim 1, wherein said component is a guide vane.

3. The method according to claim 2, wherein the guide vane is disposed as a load-bearing guide vane in an intermediate casing structure of the gas turbine engine.

4. The method according to claim 3, wherein the fiber-composite material of said component is connected to at least one construction element.

5. The method according to claim 4, wherein the at least one construction element is a platform or flange and is connected to an aerodynamic vane of the guide vane.

6. The method according to claim 5, wherein disposed in a region between the guide vane and the at least one construction element is a filler material which comprises unidirectional fibers and/or a braided fabric.

7. The method according to claim 5, wherein the aerodynamic vane is connected to the platform, with of a polymer-adhesive connection and/or a metallic connector.

8. The method according to claim 4, wherein the at least one construction element has at least one connecting element, or is connected to the at least one connecting element.

9. The method according to claim 8, wherein the at least two of the plurality of rovings adjacent to the at least one connecting element are adapted to a shape of the at least one connecting element.

10. The method according to claim 4, wherein the at least one construction element is a platform, and has a closure layer from fibrous material, with a fiber orientation from one major length side of the platform to an opposing major length side of the platform.

11. The method according to claim 2, wherein a transitional region at least partially extends about an aerodynamic vane and wherein the transitional region connects the aerodynamic vane to a platform and the connection is established at an angle between 60° and 120°.

12. The method according to claim 1, wherein the at least one of the plurality of rovings or the at least two of the plurality of rovings are deposited along a direction of main stress of the component.

13. The method according to claim 1, wherein cross-sectional faces of the at least one of the plurality of rovings are shaped such that cross-sectional faces in at least two sectional planes of the component are a function of the shape of the cross-sectional face of the at least one of the plurality of rovings.

14. The method according to claim 13, wherein the cross-sectional face of the at least one of the plurality of rovings is flat, rectangular having radiused corners, trapezoidal, or wedge-shaped.

15. The method according to claim 13, wherein a cross-sectional face of the at least one of the plurality of rovings is elliptic, wherein a length of a semi-major axis of the cross-sectional face is a function of a largest longitudinal extent of the component in one of the at least two sectional planes.

16. The method according to claim 1, wherein in at least two cross sections of the component, a ratio between a cross-sectional face of the at least one of the plurality of rovings and cross-sectional faces of the component is constant.

* * * * *